United States Patent [19]
Maggio

[11] Patent Number: 4,646,470
[45] Date of Patent: Mar. 3, 1987

[54] FAST FIT LINER FOR EARTH BALL

[76] Inventor: Lewis R. Maggio, State Line Rd., Lowell, Ind. 46356

[21] Appl. No.: 729,059

[22] Filed: Apr. 30, 1985

[51] Int. Cl.$^4$ .............................................. A01G 23/04
[52] U.S. Cl. ............................................ 47/76; 383/75
[58] Field of Search .................. 47/76, 72, 84, 73, 74, 47/66, 77; 206/423; 229/87 P, 87 R; 383/76, 71, 72, 75

[56] References Cited

U.S. PATENT DOCUMENTS

| | | | |
|---|---|---|---|
| 708,234 | 9/1902 | Laird | 388/76 X |
| 1,464,534 | 8/1923 | Lovett | 47/73 |
| 1,951,642 | 3/1934 | Augustin et al. | 47/66 |
| 1,954,006 | 4/1934 | Wolf | 47/66 |
| 1,994,553 | 3/1935 | Wollcott | 47/74 |
| 2,302,259 | 11/1942 | Rothfuss | 47/72 |
| 2,600,300 | 6/1952 | Katz | 206/423 X |
| 2,691,998 | 10/1954 | Stucker | 383/72 X |
| 2,796,700 | 6/1957 | Katz | 206/423 X |
| 2,827,217 | 3/1958 | Clement | 47/72 X |
| 2,850,842 | 9/1958 | Eubank | 47/76 X |
| 2,934,204 | 4/1960 | Pardee | 206/423 |
| 3,550,318 | 12/1970 | Remke et al. | 47/76 |
| 3,550,662 | 12/1970 | Remke | 383/76 |
| 3,814,239 | 6/1974 | McGinley et al. | 47/76 X |
| 3,888,042 | 6/1975 | Bourne | 47/74 |
| 4,109,442 | 8/1978 | Maasbach | 47/76 X |

FOREIGN PATENT DOCUMENTS

| | | | |
|---|---|---|---|
| 1515205 | 3/1968 | France | 383/71 |
| 2397342 | 3/1979 | France | 47/76 |

Primary Examiner—James R. Feyrer
Assistant Examiner—Danton DeMille
Attorney, Agent, or Firm—Hill, Van Santen, Steadman & Simpson

[57] ABSTRACT

A fast fit liner for an earth ball of the type surrounding nursery plants and trees for transportation is formed from a square piece of cloth material which is folded at midpoints along each side thereof to form interiorly extending pleats, with the seams of the pleats being sewn. The seams divide the cloth into four sections which are drawn around the earth ball. The top free corners of each section can be folded over to receive a rope or other type of drawstring to pull the corners tight around the trunk of the plant or tree. The cloth can be folded and sewn in a number of different configurations to vary the shape of the liner to meet different requirements.

4 Claims, 5 Drawing Figures

FAST FIT LINER FOR EARTH BALL

BACKGROUND OF THE INVENTION

1. Field of the Invention

The present invention relates to liners for earth balls surrounding plants and trees and the like.

2. Description of the Prior Art

Liners comprised of burlap or other types of decomposable material are known in the art for surrounding the earth ball covering the roots of small trees and plants for transportation thereof, such as from a nursery to the location where the plant or tree is to planted. Such liners must be attached to the earth ball after the plant or tree is removed from the ground at the nursery. Conventional liners are simply pieces of burlap or other cloth of varying sizes and shapes, with the earth ball being set generally in the center of the cloth and the cloth being pulled up around the earth ball and tucked and pinned, usually by common nails. Such tucking and pinning must be done manually and in order to adequately cover the earth ball can be extremely time consuming and difficult.

SUMMARY OF THE INVENTION

It is an object of the present invention to provide a liner for the earth ball of a tree or plant which can be rapidly drawn around the earth ball to completely cover the earth ball for transportation.

The above object is inventively achieved in a liner comprised of a generally square piece of material which is folded at its midpoints to form a number of interiorly extending pleats. The pleats are then sewn to form seams which generally divide the liner into four segments. Each segment has a free corner which can be folded over to receive a drawstring. The plant or tree with the earth ball surrounding its roots is placed in the liner with the drawstring loose, and the drawstring is then pulled around the trunk of the plant or tree, which automatically pulls the segments of the liner tight around the sides and top of the earth ball. The drawstring is then tied to secure the liner. No tucking or folding is necessary on the part of the nursery worker nor is any further securing means, such as nails or other types of pins, needed. The liner can be rapidly put in place around an earth ball in an easier and quicker fashion than conventional liners which require manual tucking and pinning.

DESCRIPTION OF THE PREFERRED EMBODIMENTS

Figure 1:
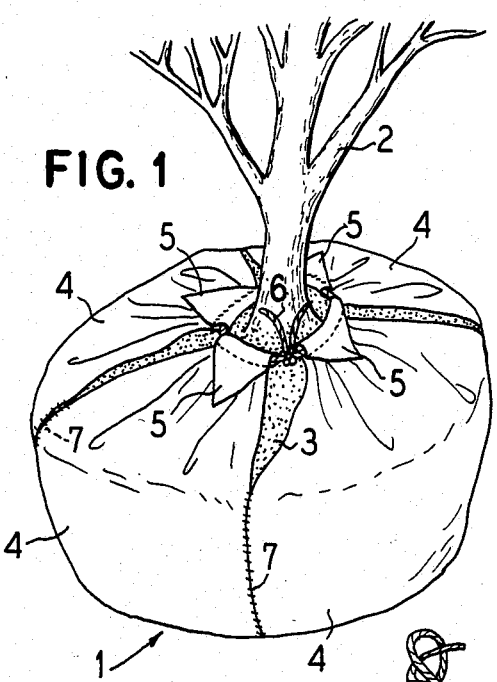
FIG. 1 is a perspective view of a liner constructed in accordance with the principles of the present invention in place around the earth ball of a small tree.

A liner 1 for surrounding and retaining the earth ball 3 of the root system of a small plant or tree 2 is shown in Figure 1. The liner 1 generally consists of a plurality of segments 4 each having a corner forming a flap 5 which is folded over and sewn so as to receive a drawstring 6. The segments 4 are held together by a plurality of seams 7, two of which are visible in FIG. 1.

Figure 2:
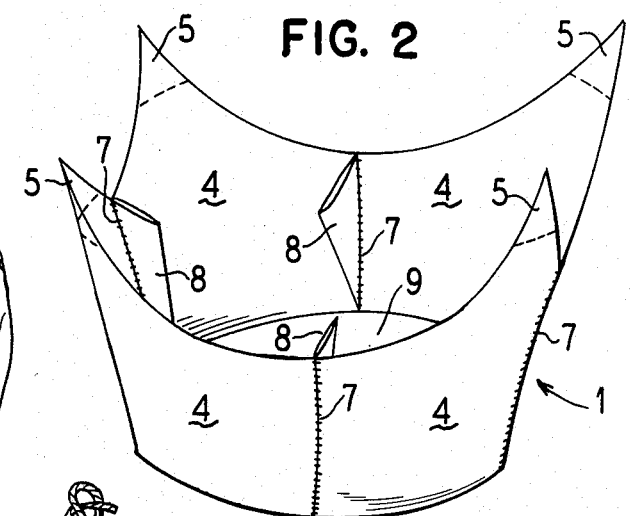
FIG. 2 is a perspective view of a liner constructed in accordance with the principles of the present invention during a first stage of manufacture.
Figure 3:
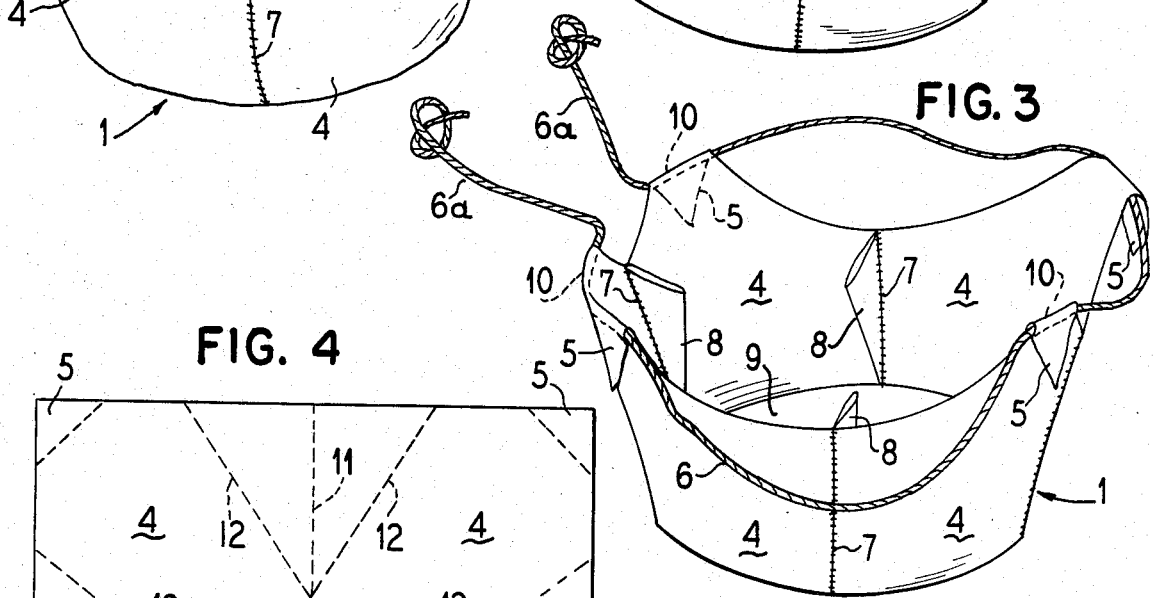
FIG. 3 is a perspective view of a liner constructed in accordance with the principles of the present invention in a substantially completed stage of manufacture.
Figure 4:
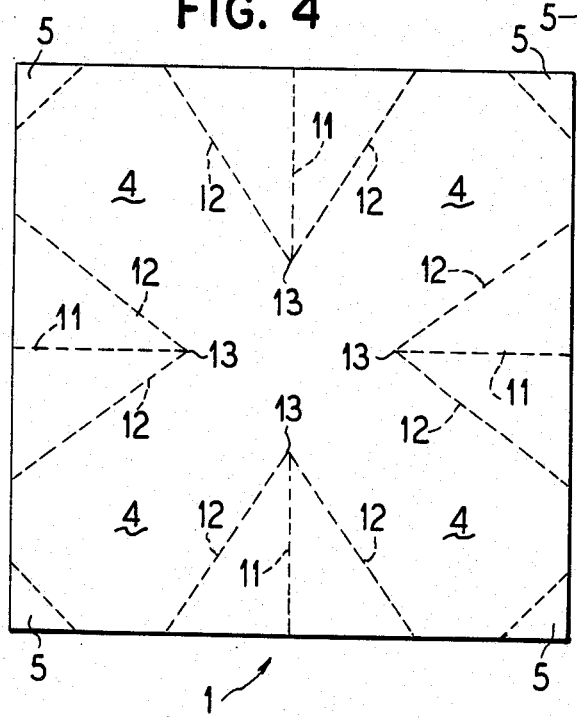
FIG. 4 is a plan view of one embodiment of a piece of material for use as a liner in accordance with the principles of the present invention.

The liner 1 is shown during assembly in FIG. 2. The liner of FIG. 2 is made by folding a generally square piece of material, such as burlap, along defined fold lines as shown by the dashed lines in FIG. 4. Each side of the square piece of material is first folded along lines 11 proceeding generally perpendicularly from the midpoints of each side of the square piece of material. The lines 11 terminate at a point 13 short of the center of the piece of material, thereby leaving a central base portion 9, as shown in FIG. 2. Each fold 11 forms an interiorly extending pleat 8, three of which can be seen in FIG. 2. The pleats 8 are then sewn along the fold line 11, forming a plurality of seams 7. The seams 7 divide the liner into a plurality of continuous segments 4, each of which has an upper free end forming a flap 5. Each flap 5 is folded over to receive a drawstring 6 through channels 10 formed by the folded over and secured flaps 5. The drawstring 6 has free ends 6a.

The earth ball of the plant or tree to be transported is placed in the liner 1 with the drawstring 6 loose. This provides ample room for the earth ball to be placed generally in the center of the liner on the base portion 9. The free ends 6a the drawstring 6 are then pulled so as to tighten the liner around the earth ball and to draw the sections 4 closely around the sides and top of the earth ball. When the drawstring 6 has been tightened to its fullest extent, the free ends 6a tied, thereby securing the liner 1 around the earth ball. No further securing means such as pins are necessary, and no tucking or other folding is needed to adequately fix the liner in place.

Figure 5:
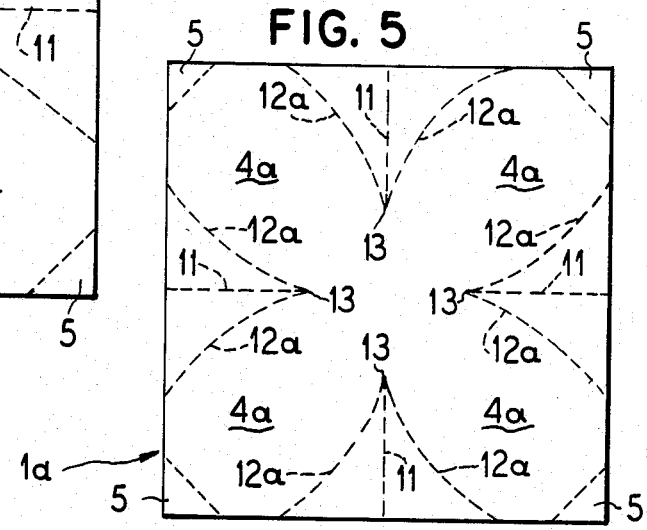
FIG. 5 is a plan view of another embodiment of a piece of material for use as a liner in accordance with the principles of the present invention.

A further embodiment for the fold lines for the liner is shown in FIG. 5. In this embodiment the lines 12a, which will be sewn to form the seams between each segment 4a, are curved rather than straight. This will better conform the shape of the liner, in some instances, to the shape of the earth ball. Various other types and configurations of folding systems can be utilized without departing from the inventive concept disclosed herein.

Although modifications and changes may be suggested by those skilled in the art it is the intention of the inventor to embody within the patent warranted hereon all changes and modificatons as reasonably and properly come within the scope of his contribution to the art.

I claim as my invention:

1. A liner for an earthen ball surrounding the root system of a plant comprising:

a generally square piece of material having four interiorly extending pleats formed by folding said material along a plurality of lines extending inwardly generally perpendicularly from the midpoints of each side of said material, said lines terminating short of a center of said material, and each of said four pleats being sewn dividing said material into four segments, each segment having a free end being a corner of said square piece, and each free end being folded over and secured; and a drawstring extending through each of said folded over free ends for drawing and tightening said liner around the sides and top of said earthen ball;

whereby said drawstring may be pulled to quickly secure said liner around an earthen ball.

2. A liner as claimed in claim 1 wherein said seams of said pleats are substantially straight lines.

3. A liner as claimed in claim 1 wherein each of said seams of said pleats is a curved line.

4. A liner as claimed in claim 1, wherein said material is a web of fabric.

* * * * *